United States Patent [19]
Cordell

[11] Patent Number: 5,405,233
[45] Date of Patent: Apr. 11, 1995

[54] DUMPSTER HANDLING SYSTEM

[76] Inventor: Steven R. Cordell, 121 Burnish Ct., Silverdale, Pa. 18962

[21] Appl. No.: 63,744

[22] Filed: May 20, 1993

[51] Int. Cl.⁶ ............................................. B65G 67/08
[52] U.S. Cl. ................................... 414/389; 414/346; 414/398; 414/494
[58] Field of Search ............... 414/343, 345, 346, 389, 414/349–353, 390, 398, 494, 500, 328, 329; 280/677

[56] References Cited

U.S. PATENT DOCUMENTS

| | | |
|---|---|---|
| 745,034 | 11/1903 | Barnes . |
| 1,557,784 | 10/1925 | Sharpnack . |
| 2,004,095 | 6/1935 | Hankins et al. . |
| 2,127,972 | 8/1938 | Hutchinson et al. ............ 414/343 X |
| 2,789,715 | 4/1957 | Filipoff et al. . |
| 3,662,906 | 5/1972 | Christensen ........................ 414/390 |
| 4,039,090 | 8/1977 | Desourdy ........................ 414/389 X |
| 4,120,509 | 10/1978 | Reeve et al. ..................... 280/677 |
| 4,185,854 | 1/1980 | Brando ............................. 280/677 X |
| 4,203,697 | 5/1980 | Cayton ............................ 414/500 X |
| 4,396,339 | 8/1983 | Johnson ............................. 414/389 |
| 4,832,561 | 5/1989 | Nijerhuis ........................... 414/500 |
| 4,915,567 | 4/1990 | Ellingser .......................... 414/345 |
| 5,017,076 | 5/1991 | Condrey ........................... 414/345 |
| 5,114,303 | 5/1992 | Kirchhoff et al. ............. 414/346 X |

OTHER PUBLICATIONS

D. R. Cordell & Assoc Inc., Overhead Material Handling Equipment, Proposal No. 2–4256, dated Mar. 10, 1992.

D. R. Cordell & Assoc. Inc. Overhead Material Handling Equipment, Proposal No. 2–4256, dated Apr. 2, 1992.

*Primary Examiner*—David A. Bucci
*Attorney, Agent, or Firm*—Joseph W. Molasky & Associates

[57] ABSTRACT

A dumpster handling system is operated to support and move a roll-off dumpster back and forth underneath a point of material discharge for the filling of the dumpster. The system operates to move the dumpster so that the material is deposited at different points into the interior of the dumpster to achieve an even distribution of the load of material throughout the dumpster.

8 Claims, 9 Drawing Sheets

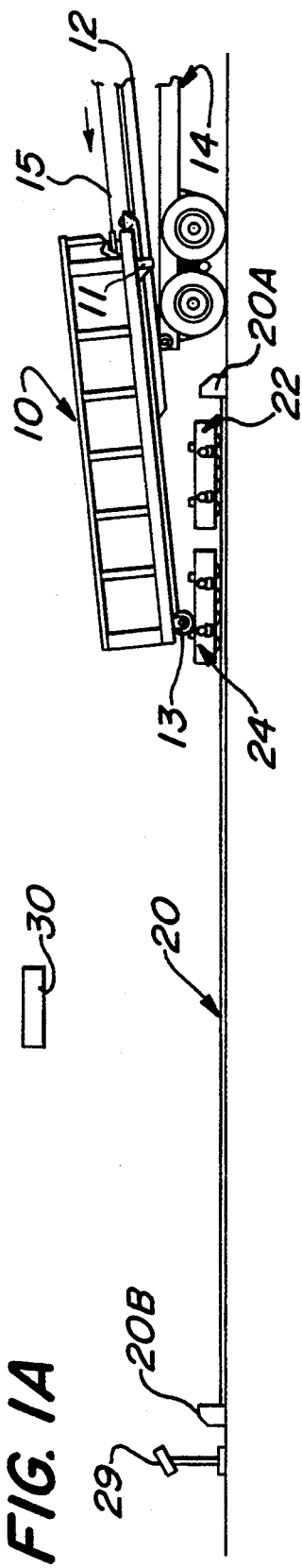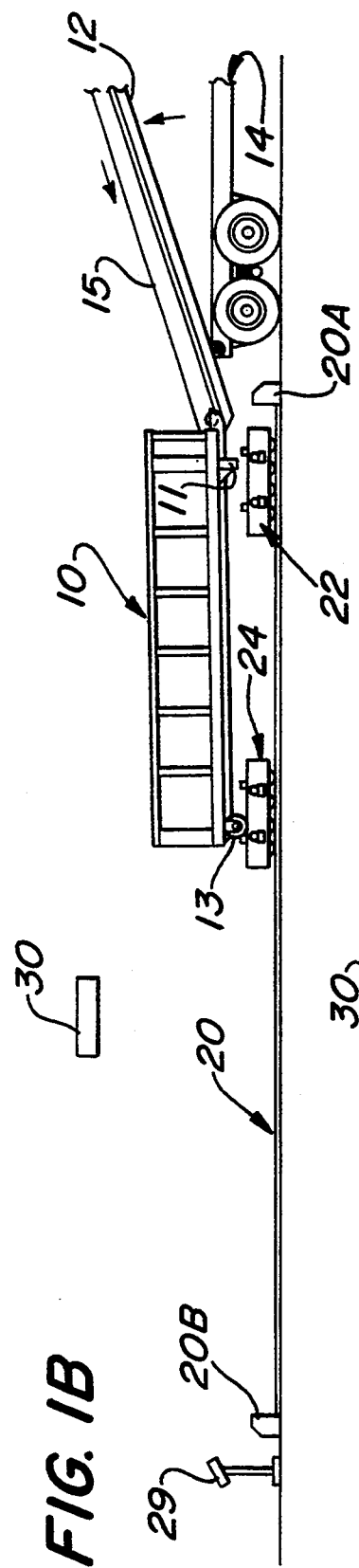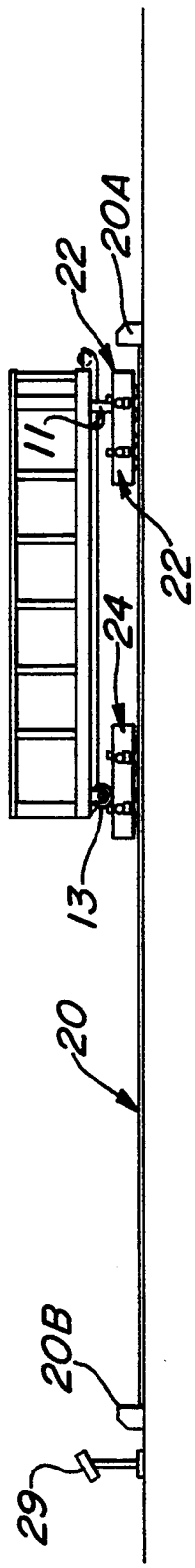

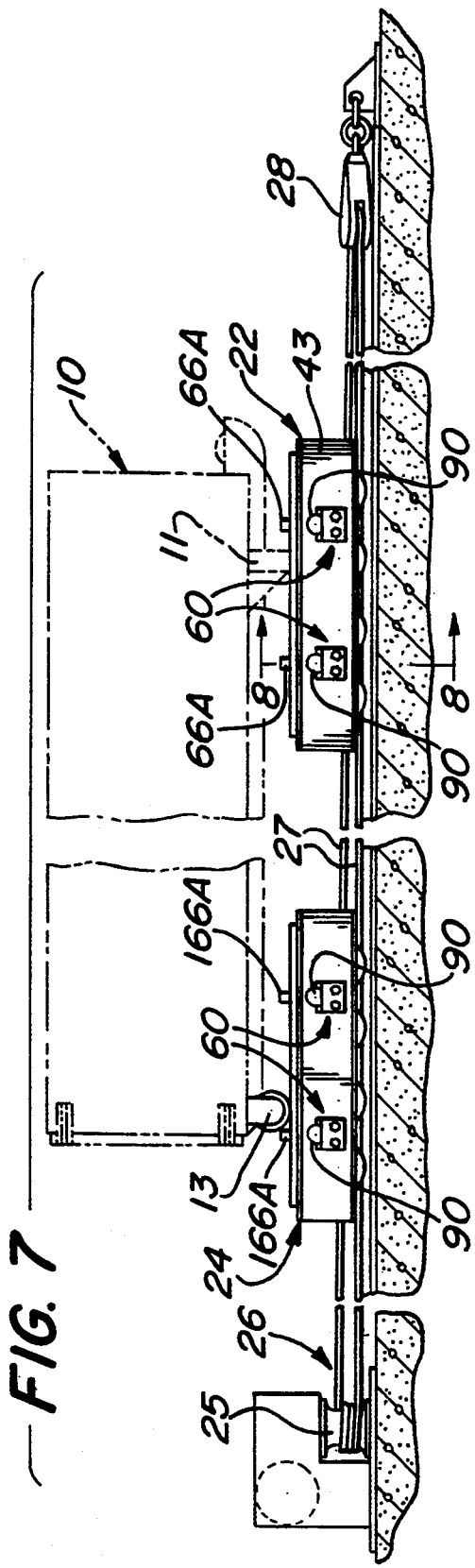
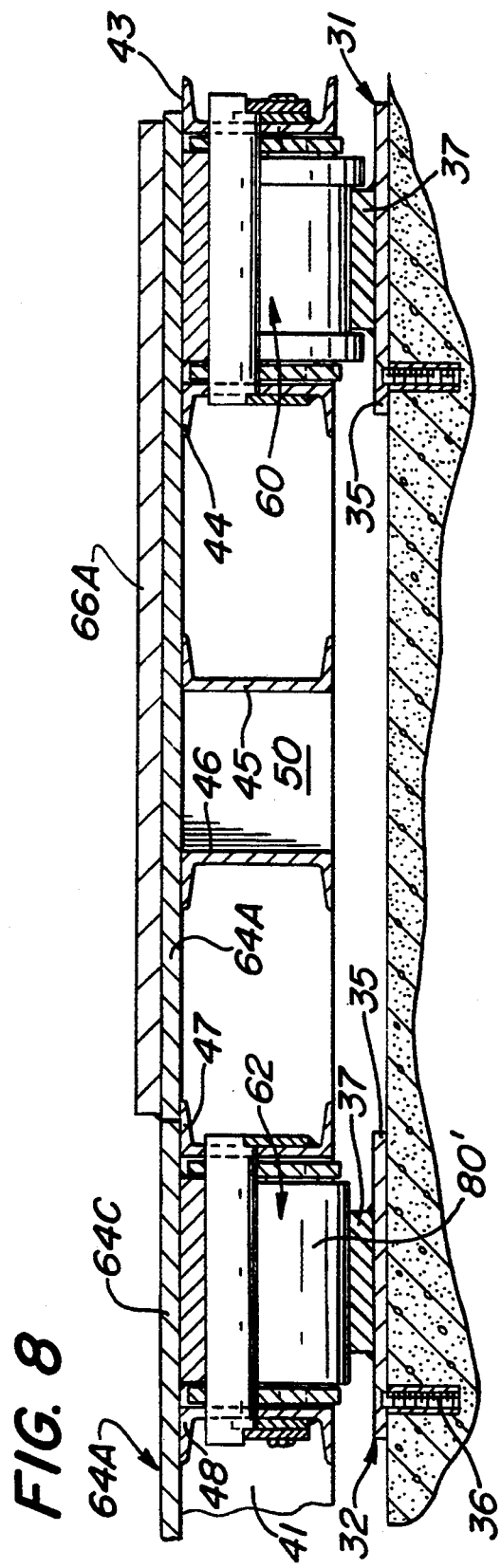
FIG. 7
FIG. 8

DUMPSTER HANDLING SYSTEM

BACKGROUND OF THE INVENTION

This invention relates generally to a system for the handling of containers such as roll-off dumpsters. The system is particularly adapted for use in a water treatment plant for the collecting and removal of the sludge which is conveyed from a filter press and discharged into the interior of a dumpster positioned beneath the discharging end of the sludge conveyor.

A major problem encountered in water treatment plants of the indicated type is that when the sludge is discharged from the conveyor into a dumpster, the sludge piles up in the dumpster at one location directly underneath the discharging end of the conveyor. One attempted solution to this problem was to move the dumpster in order to get a better distribution of the sludge dispensed therein, such movement being achieved either manually or by means of a truck or other vehicle attached to the dumpster. In addition, an employee would actually get inside the dumpster and rake the sludge deposited in the dumpster back and forth in order to achieve a better distribution thereof. Another proposed solution to the problem was to provide an overhead conveyor system that would discharge the sludge at different points along the length of a stationary dumpster. However, such a conveyor system would be excessively expensive and would, for example, cost as much as $80,000, and require a substantial amount of additional maintenance.

SUMMARY OF THE INVENTION

It is the general object of the invention to provide and operate a dumpster handling system for the collection of a loose solid material, such as the sludge from a water treatment plant, which material is discharged from a fixed point of discharge into a roll-off dumpster with an even distribution of the material throughout the length of the dumpster.

In accordance with the invention, the dumpster handling system is comprised of a track means extending laterally throughout a substantial distance underneath the material discharge point, a first dumpster supporting carrier for supporting the front end of a dumpster and arranged to move along the track means, a second dumpster supporting carrier for supporting the rear end of the dumpster and arranged to move along the track means, and power-operated means for causing the first dumpster supporting carrier to move back and forth along the track means.

In accordance with the invention, the dumpster handling system is operated by positioning the first carrier at the load/unload end of the track means and the second carrier adjacent said first carrier. A dump truck carrying an empty roll-off dumpster is backed up to the load/unload end of the track system and is operated to tilt its dumpster support means so that, initially, the rear support wheels of the dumpster are positioned onto the second carrier, during which operation the dumpster is passed over the first carrier, and subsequently, the second carrier, with the rear end of the dumpster supported thereon, is caused to move from its initial position toward the back end of the track means and away from the first carrier until the front support means of the dumpster is positioned onto the first carrier whereby the dumpster and the first and second carriers form a unit movable together along the track means. The power-operated means is then operated to cause the unit, including the dumpster, to move back and forth along the track means whereby said dumpster is moved underneath the point of material discharge for achieving an even distribution of the material deposited into the dumpster. The dumpster is removed from the first and second carriers and reloaded on a dump truck when the desired amount of material is contained therein.

BRIEF DESCRIPTION OF THE DRAWINGS

FIGS. 1A, 1B, and 2 to 5 are schematic views illustrating the method of operation of a dumpster handling system in accordance with the invention to collect sludge dispensed from a conveyor of a water treatment plant.

FIG. 7 is a sectional view taken on line 7—7 of FIG. 6.

FIG. 8 is a fragmentary sectional view taken on line 8—8 of FIG. 7.

DETAILED DESCRIPTION OF THE PREFERRED EMBODIMENTS

Figure 3:
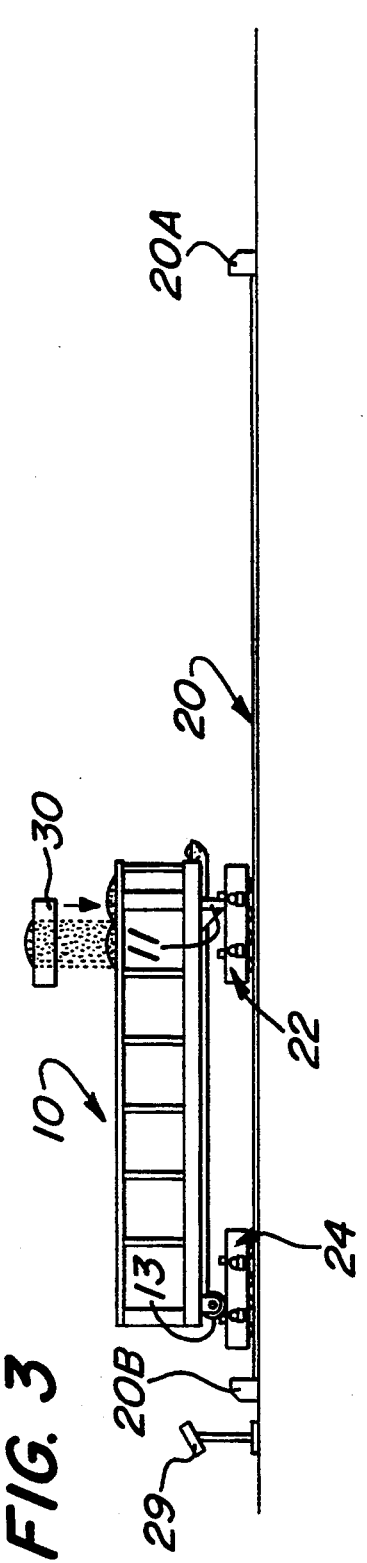
Figure 4:
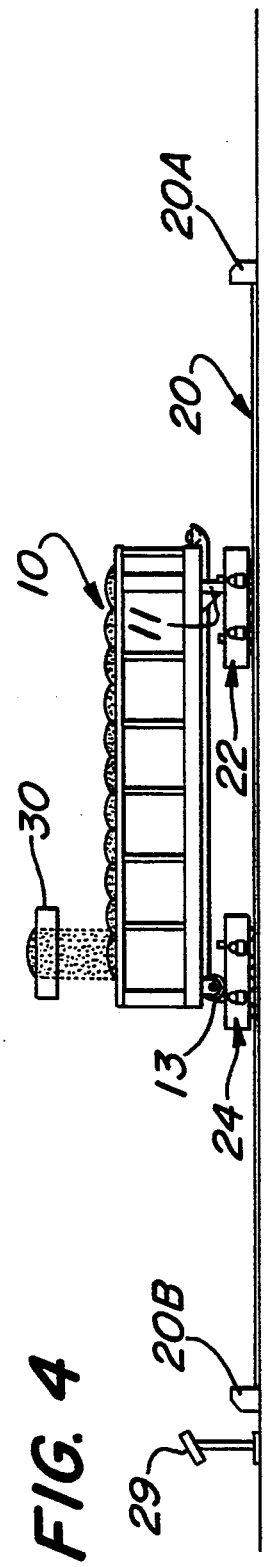
Figure 5:
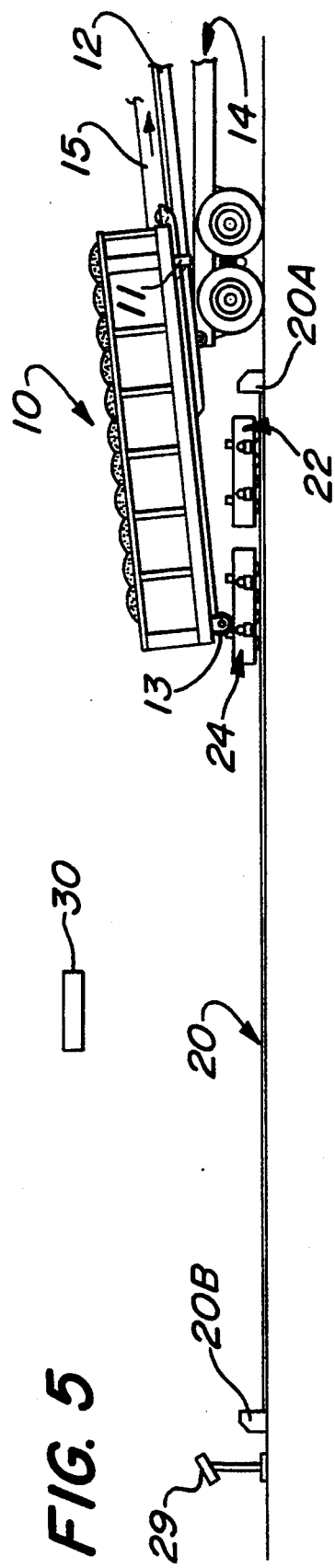

Referring to FIGS. 1A, 1B, and 2 to 5, the dumpster 10 shown in these figures is adapted to be carried on a tiltable dumpster support means 12 of a dump truck 14 and to be unloaded from and reloaded onto the dumpster support means 12, which construction is well known in the art. Thus, dumpster 10 is a large open-topped container, typically about twenty-two feet in length capable of containing a fifteen ton load, and has a front end support means 11, such as a pair of legs (or wheels in some cases), and a rear end support means 13, such as a pair of wheels. Truck 14 is typically provided with a tiltable dumpster support means 12 (such as a pair of lubricated rails) which can be raised and lowered from a flat position, for use in the transporting of the dumpster 10, and a plurality of tilted or backwardly inclined positions for use in the loading and unloading of the dumpster 10 from the truck 14, as is shown in FIGS. 1 and 5, for example. Truck 14 is also provided with a winch means (not shown) such as a cable winch which includes a cable 15 which is connected at its free end to the dumpster 10 during an unloading or reloading operation. The winch means on the truck 14 is adapted to wind and unwind the cable 15 to raise and lower the dumpster 10 onto and off of the dumpster support means 12 when the dumpster support means 12 is in an inclined position whereby the dumpster 10 slides along the dumpster support means 12 as the winch cable 15 is unwound and wound for use in unloading and reloading of the dumpster 10 off of and onto the dumpster support means 12 as is well known in the art.

Figure 6:
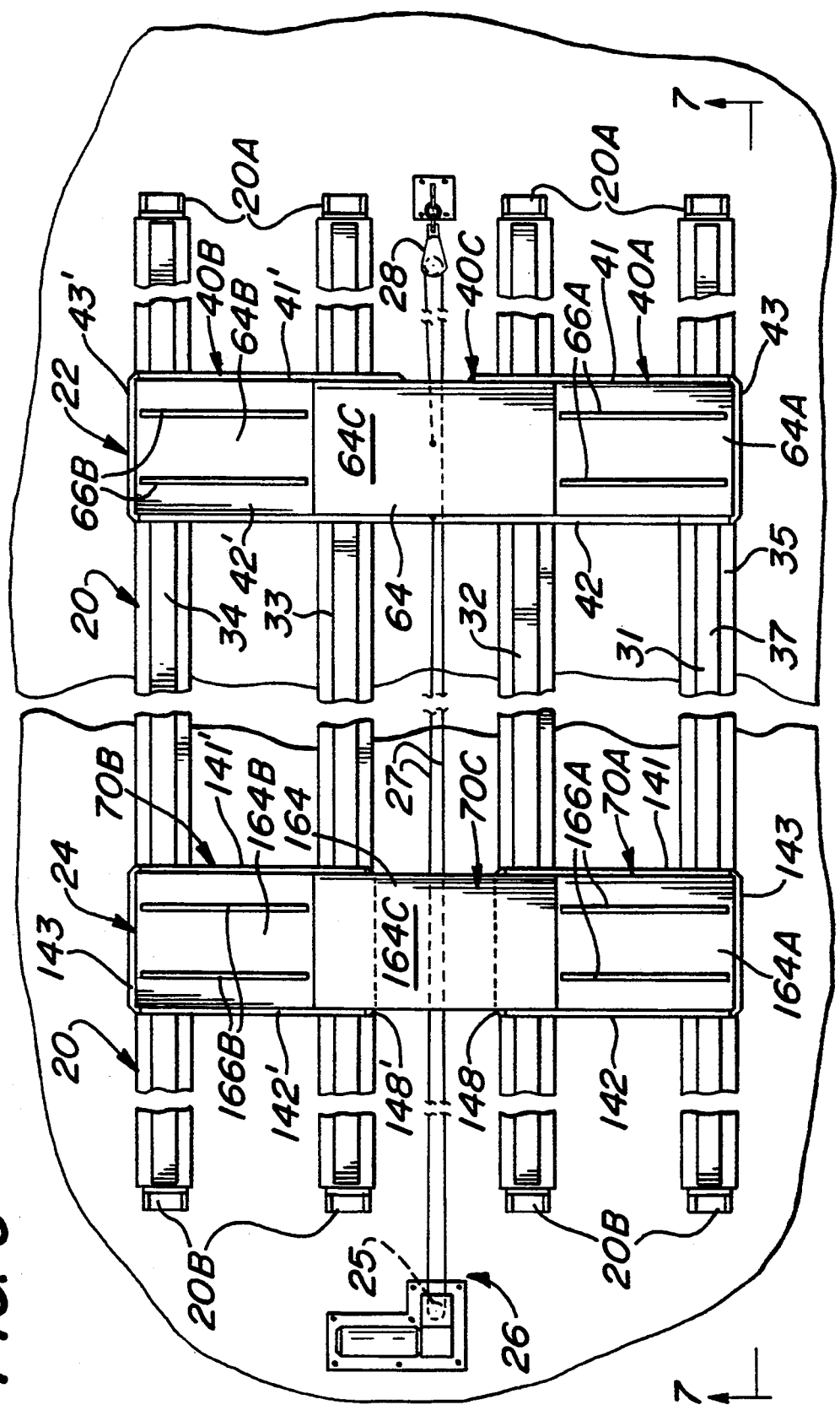
FIG. 6 is a plan view of a dumpster handling system in accordance with the invention.

The dumpster handling system of the invention comprises four main components, namely, a track means 20, a first dumpster supporting carrier 22, a second dumpster supporting carrier 24, and a power-operated means in the form of a motor driven winch means 26 and its associated motor operated cable drum 25, cable 27 and sheave 28, which are best shown in FIGS. 6 and 7 and will be discussed more fully hereafter. A pedestal 29 is provided to support the controls for the winch means.

First and second carriers 22 and 24 are each provided with a plurality of wheels which are engaged on the track means 20, which comprises four parallel tracks 31–34 bolted down to a flat concrete surface, as will be described more fully hereafter. First carrier 22 is connected to the cable 27 of winch means 26 which is of a closed loop, electrically operated type. When activated, winch means 26 will move first carrier 22 back and forth along the track means 20 as will be discussed more fully hereafter. Second carrier 24 is freely movable, as by the application of manual force, along the track means 20. Carrier 24 is also movable in response to the force applied thereto by the movement of a dumpster 10 supported thereon during an unloading or reloading operation as will be described hereafter.

The track means 20 extends along a substantial lateral extent underneath the point of discharge of the sludge between a load/unload end and a back end, said track ends being provided with safety stops 20A and 20B, respectively. Stops 20A and 20B are provided for safety purposes and are constructed and arranged for contacting the first and second carriers 22 and 24 to prevent the movement thereof off of the track means. Each of the tracks 31–34 is provided with a pair of stops 20A and 20B at the load/unload end and the back end thereof, respectively, as is best shown in FIG. 6.

In the operation of the dumpster handling system in accordance with the invention, the first step is to unload an empty dumpster 10 from a dump truck 14 and position the same onto the carriers 22 and 24. In this step, the first carrier 22 is positioned adjacent the load/unload end of the track means 20 and the second carrier 24 is positioned adjacent to the first carrier 22 in its position adjacent the load/unload end of the track means 20. The initial position of the carriers 22 and 24 is illustrated in FIG. 1A and is the usual position of carriers 22 and 24 after a previous cycle of operation of unloading, filling and reloading of a dumpster has been completed. If carriers 22 and 24 are out of this position for some reason, carrier 22 can be so positioned by operation of winch means 26 and carrier 24 can be manually moved into position. Also, as part of this step, a dump truck 14 carrying an empty dumpster 10 is backed up to the load/unload end of the track means 20 and, with the carriers 22 and 24 in position as shown in FIG. 1A, the dumpster support means 12 of the truck 14 is tilted backwards to permit the unloading of the dumpster 10 therefrom as will be described hereafter.

The procedure for unloading the dumpster 10 from the truck 14 includes the initial step of raising the dumpster support means 12 an amount sufficient so that the rear end of the dumpster 10 slides along the rails forming the dumpster support means 12 off of the rear end of the truck 14 by means of gravity to position the rear end support means 13 of dumpster 10 in a secure position (between retaining bars described hereafter) on the second carrier 24, during which step the rear end of the dumpster 10 passes over the first carrier 22 to be positioned in a secure position on said second carrier 24. The cable 15 of the truck winch is unwound gradually to control the movement of the dumpster 10 during this initial stage of the unloading operation.

This condition of the dumpster handling system is illustrated in FIG. 1A.

From the position shown in FIG. 1A, the dumpster support means 12 of track 14 is usually tilted back an additional amount (to increase the inclination) and the cable 15 of the winch of the truck 14 is unwound an additional amount to cause the second carrier 24 to move along the track means 20 by means of gravity toward the back end thereof and away from the first carrier 22 until the front end support means 11 of the dumpster 10 is positioned in a secure position (between retaining bars described hereafter) on the first carrier 22. FIG. 1B shows the condition of the dumpster handling system partway through this stage of the unloading operation. FIG. 2 illustrates the condition of the parts upon the completion of the unloading of the dumpster 10 from the truck 14 and in position supported on carriers 22 and 24. It will be noted that the movement of the dumpster 10 as it slides off the tilted dumpster support means 12 of truck 14 by gravity is controlled by the winch means on the truck 14 and that as the unloading procedure continues, the second carrier 24 is free to travel toward the back of the track means 20, being pushed by the weight of the dumpster 10 sliding off of the dumpster support means 12 of truck 14 by gravity. Once the front end of the dumpster 10 is located on the first carrier 22, in the condition as shown in FIG. 2, the cable 15 of the winch means of the truck 14 is disconnected from the dumpster 10.

With the dumpster 10 located in the supported position on the first and second carriers 22 and 24, it will be noted that the dumpster 10 and the carriers 22 and 24 form a unit of parts that will move together along the track means 20. Furthermore, this unit can be moved back and forth along the track means 20 between the positions shown in FIGS. 3 and 4 by the operation of the power-operated winch means 26 in order to achieve the even distribution of the sludge deposited into the dumpster 10 from a fixed point of discharge from a sludge conveyor 30. Thus, the winch means 26 is operated to cause the first carrier 22 engaged therewith, and the unit including the dumpster 10 and the second carrier 24, to move along said track means 20 whereby dumpster 10 is moved laterally underneath the fixed point of material discharge from the sludge conveyor 30 so as to achieve an even distribution of the material deposited into the dumpster 10 throughout the length thereof.

Once the dumpster 10 is fully loaded, the final step is to reload the dumpster 10 onto the truck 14. This final step is achieved by moving the unit including dumpster 10 and its two supporting carriers 22 and 24 to the load/unload end of the track means 20 by the operation of the power-operated winch means 26. The dumpster support means 12 of the truck 14 is tilted to a position so that dumpster 10 can be reloaded thereon and the cable 15 of the truck winch is connected to the dumpster 10, after which the truck winch is operated to wind up cable 15 to pull the dumpster 10 onto the dumpster support means 12 of truck 14. At the beginning of this operation, the front support means 11 of dumpster 10 is immediately lifted off of first carrier 22 because of the inclined position of dumpster support means 12 of truck 14 whereby first carrier remains in a stationary condition while the rear carrier 24 moves forward and the dumpster 10 is reloaded onto the truck 14 in a manner essentially the reverse of the dumpster unloading procedure described above and as illustrated in FIG. 5. At the end of the reloading step, carriers 22 and 24 are in position at the load/unload end of track means 20 to receive the next dumpster to be unloaded thereon for the next cycle of operation.

FIGS. 6 to 12 show the details of construction of the main components of the dumpster handling system in accordance with the invention.

The construction of the four tracks 31-34 comprising the track means 20 is best shown in FIGS. 6 and 8. Each of the tracks 31-34 comprises a flat elongated steel base 35 and an elongated steel rail 37 constructed and arranged as shown in the drawings. The base 35 rests on the concrete floor beneath the conveyor 30 and is secured thereto by means of a plurality of threaded fasteners 36 (FIG. 8) of a type well known in the art, such as masonry anchors. Fasteners 36 are and positioned at spaced apart locations along the length of the base 35. The rail 37 is secured on the top surface of base 35 by being welded thereto. The top surface of rail 37 provides the running surface for the wheels of the carriers 22 and 24 as will be described hereafter.

Figure 9:
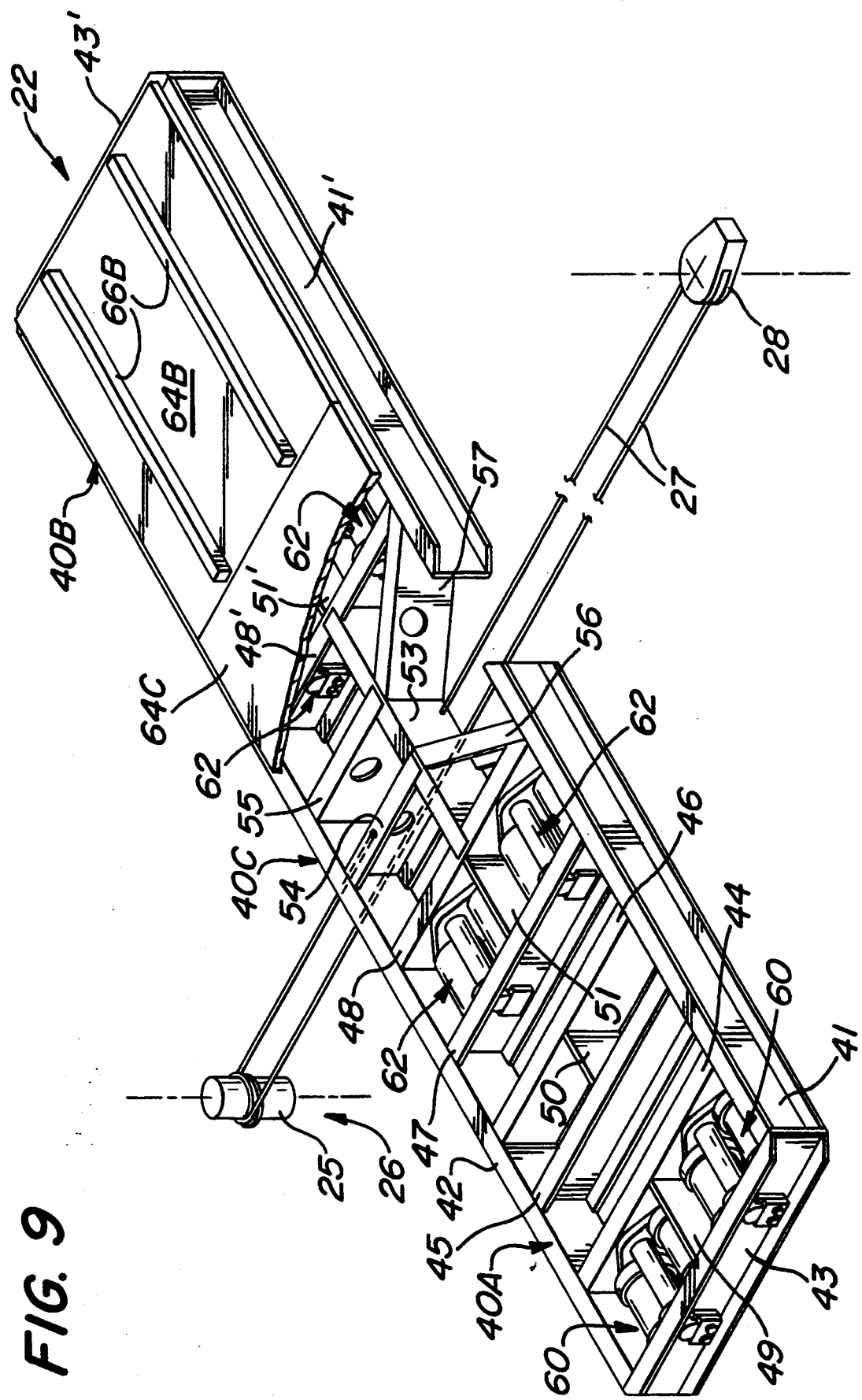
FIG. 9 is an isometric view of a first dumpster supporting carrier used in the dumpster handling system shown in accordance with the invention.
Figure 10:
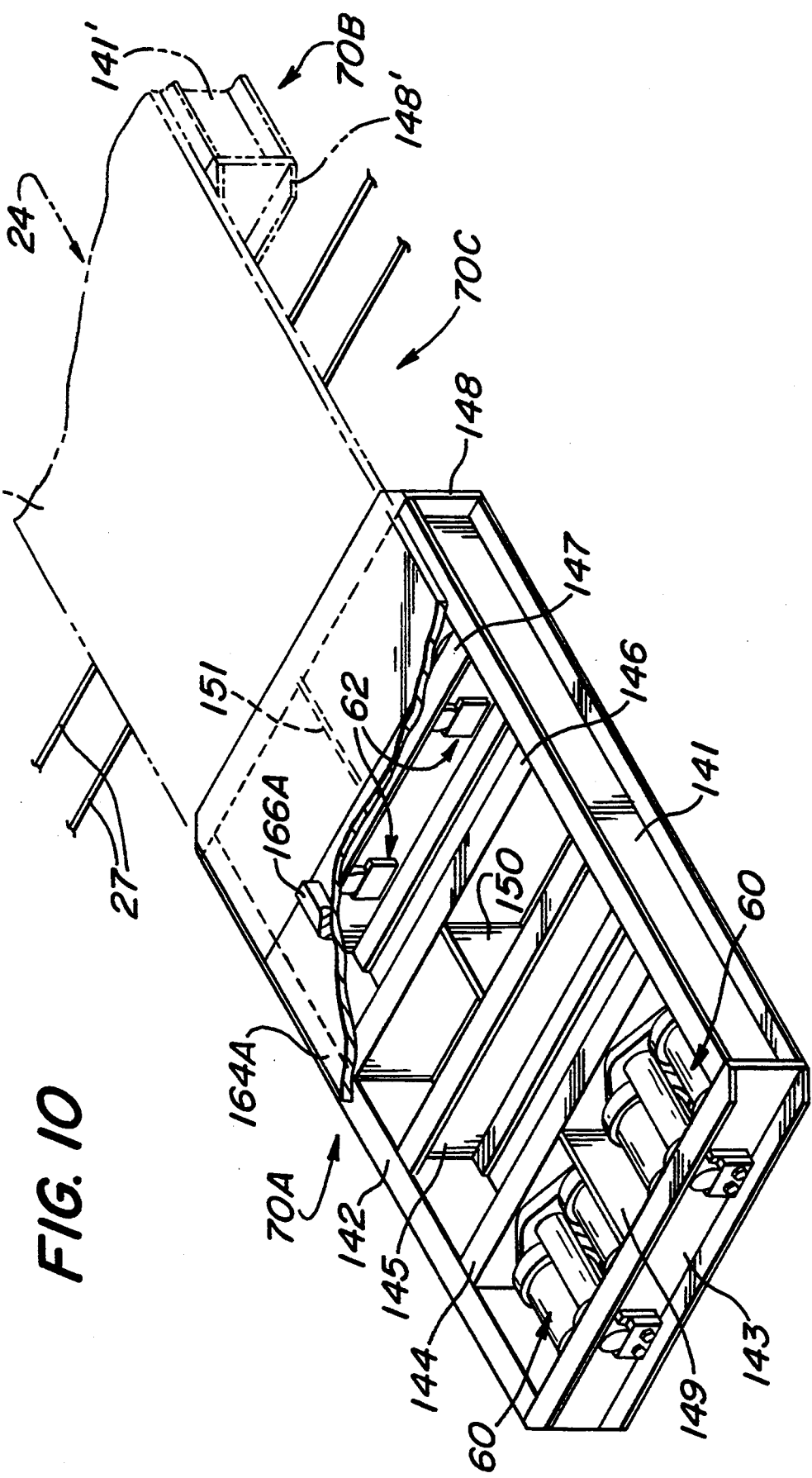
FIG. 10 is an isometric view of a second dumpster supporting carrier used in the dumpster handling system shown in accordance with the invention.

As is best shown in FIG. 9, the first carrier 22 is comprised of a plurality of structural channel members, brace members, and flat plates welded together to form a rigid, generally flat construction. Carrier 22 comprises a pair of outer sections 40A and 40B and a midsection 40C located between outer sections 40A and 40B. As shown in FIG. 6, outer section 40A is arranged to overly tracks 31 and 32, outer section 40B is arranged to overly tracks 33 and 34, and midsection 40C extends across the space between tracks 32 and 33. As will be described more fully hereafter, the space between tracks 32 and 33 is the place where the cable 27 and the sheave 28 of the winch means 26 are located.

Outer sections 40A and 40B have essentially the same construction with the parts of the superstructure thereof being arranged in a reverse order as is apparent from FIG. 9, each of the sections 40A and 40B having a rectangular configuration defined by perimeter channel members. Thus, outer section 40A comprises a front channel 41, an outer portion of a rear channel 42, which extends along the entire width of the carrier 22 across the four tracks 31-34, and six beam members 43-48 extending between front perimeter channel 41 and the opposed outer portion of perimeter channel 42. Outer section 40A also comprises three flat brace members 49, 50, and 51, which are arranged to extend across the span between spaced apart beam members 43 and 44, 45 and 46, and 47 and 48, respectively, as shown in FIG. 9.

Outer section 40B has essentially the same construction as outer section 40A whereby corresponding parts have been given the same reference numerals with primes added. As shown in FIG. 9, the outer section 40B comprises a front channel 41', an outer portion of rear channel 42, and six beam members corresponding to beam members 43-48, including the end beam member 43' and the innermost beam member 48' shown in FIG. 9. There is also provided brace members similar to brace members 49-51 for the outer section 40A, with brace member 51' being shown in FIG. 9.

The midsection 40C comprises a front channel 53, the middle portion of rear channel 42 in the space between beam members 48 and 48' of outer sections 40A and 40B, respectively, a pair of beam members 54 and 55 extending between front channel 53 and the opposed middle portion of rear channel 42, and a pair of diagonal beam members 56 and 57 extending between front channel 53 of midsection 40C and front channels 41 and 41' of outer sections 40A and 40B, respectively, as shown in FIG. 9. By this arrangement, the midsection 40C defines an open area in the front portion thereof adapted to receive the sheave 28 of the winch means 26 for the protection of sheave 28 when the first carrier 22 is moved to the extreme end of the unload/load end of the track means 20 as, for example, in the unloading condition of FIG. 1A or the reloading condition of FIG. 5, as discussed above.

Carrier 22 is provided with a wheel means for engaging each of the tracks 31 to 34 and supporting carrier 22 for movement along the extent of the track means 20. Thus, each of the outer sections 40A and 40B is provided with four pivoting wheel assemblies, including two wheel assemblies 60 located at the outer end thereof and having flanged wheels, and two wheel assemblies 62 located at the inner end thereof and having flangeless wheels. The wheel assemblies 60 and 62 are constructed and arranged so that the flanged wheels of wheel assemblies 60 of outer section 40A ride on track 31, the flangeless wheels of wheel assemblies 62 of outer section 40A ride on track 32, the flanged wheels of wheel assemblies 60 of outer section 40B ride on track 34 and the flangeless wheels of wheel assemblies 62 of outer section 40B ride on track 33. By this arrangement of the wheel assemblies 60 and 62, the possibility of the carrier 22 binding on the tracks 31 to 34 as it moves therealong is eliminated.

The bed 64 of carrier 22 is provided by three steel plates 64A, 64B, and 64C, which are secured in position on top of the top flanges of the channels forming the superstructure of carrier 22 as described above. Plate 64A spans the area between channels 43 and 47 of outer section 40A. Plate 64B is the same size of plate 64A and spans the area between beam members 43' and 47' of outer section 40B. Plate 64C spans the central area of carrier 22 between beam member 47 of outer section 40A and beam member 47 and the corresponding beam member 47' of outer section 40B.

The bed 64 of carrier 22 is provided with means for securing and positioning the front end support means 11 of the dumpster 10 in desired position on carrier 22. To this end, plate 64A is provided with a pair of bars 66A extending transversely of the track means 20 and spaced apart an amount sufficient to receive the front end support means 11 of dumpster 10 therebetween, and plate 64B, is provided with a pair of bars 66B extending transversely of track means 20 and spaced apart the same amount as bars 66A so as to receive the front end support means 11 of dumpster 10 therebetween. Moreover, bars 66A and 66B are located on their carrier decks to insure that the front end support means 11 of dumpster 10 are positioned between the pivot pins 90 for the wheel assemblies 60 and 62 (see FIG. 7) to be described hereafter to thereby keep the load between said pivot pins 90 to prevent tipping of carrier 22 during a load-/unload operation. Bars 66A and 66B are secured on top of plates 64A and 64B, respectively, by means of welding. By this arrangement, the front end support means 11 of dumpster 10 is locked or secured on the bed 64 of carrier 22 once such means has been positioned on the bed 64 between the bars 66A and 66B in a desired non-tipping position as illustrated in FIGS. 1A, 1B, and 2 to 5, as discussed above during a description of the method of operating the dumpster handling means.

The second carrier 24 is comprised of a plurality of structural channel members, brace members, and flat plates welded together to form a rigid, generally flat construction. Carrier 24 comprises a pair of outer sections 70A and 70B and a midsection 70C located between outer sections 70A and 70B. As shown in FIG. 6, outer section 70A is arranged to overly tracks 31 and 32, outer section 70B is arranged to overly tracks 33 and 34, and midsection 70C extends across the space between tracks 32 and 33, whereat the winch means 26 is located.

Outer sections 70A and 70B have essentially the same construction as the outer sections 40A and 40B, respectively, of carrier 22, wherefore corresponding parts have been given the same reference numerals with an added "1" for the hundreds digit. Thus, outer section 70A comprises a front channel 141, a rear channel 142, and six beam members 143–148 extending between front channel 141 and rear channel 142. Outer section 70A also comprises three flat brace members 149, 150, and 151 which are arranged to extend across the span between spaced apart beam members 143 and 144, 145 and 146, and 147 and 148, respectively.

Outer section 70B has essentially the same construction as outer section 70A except for the reverse order of the beam members. Thus, the outer section 70B comprises a front channel 141', a rear channel 142' and six beam members corresponding to beam members 143–148, including the end beam members 143' and 148' shown in FIGS. 6 and 10. There is also provided brace members similar to brace members 149–151 for the outer section 70A.

The midsection 70C is devoid of any superstructure and simply comprises a steel plate 164C extending between the outer sections 70A and 70B in an arrangement similar to plate 64C of carrier 22.

Carrier 24 is provided with a wheel means for engaging each of the tracks 31 to 34 for supporting carrier 24 for movement along the extent of the track means 20. Thus, each of the outer sections 70A and 70B is provided with four pivoting wheel assemblies, including two wheel assemblies 60 located at the outer end thereof and having flanged wheels, and two wheel assemblies 62 located at the inner end thereof and having flangeless wheels. The wheel assemblies 60 and 62 are constructed and arranged so that the flanged wheels of wheel assemblies 60 of outer section 70A ride on track 31, the flangeless wheels of wheel assemblies 62 of outer section 70A ride on track 32, the flanged wheels of wheel assemblies 60 of outer section 70B ride on track 34 and the flangeless wheels of wheel assemblies 62 of outer section 70B ride on track 33. By this arrangement of the wheel assemblies 60 and 62, the possibility of the carrier 24 binding on the tracks 31 to 34 as it moves therealong is eliminated.

The bed 164 of carrier 24 is provided by three steel plates 164A, 164B, and 164C, which are secured in position on top of the top flanges of the channels forming the super-structure of carrier 24 as described above. Plate 164A spans the area between channels 143 and 147 of outer section 70A. Plate 164B is the same size of plate 164A and spans the area between beam members 143' and 147' of outer section 70B. Plate 164C spans the central area of carrier 24 between beam member 147 of outer section 70A and the corresponding beam member 147' of outer section 70B in an arrangement corresponding to plate 64C of carrier 22.

The bed 164 of carrier 24 is provided with means for securing the rear end support means 13 of the dumpster 10 in position on carrier 24. To this end, plate 164A is provided with a pair of bars 166A extending transversely of the track means 20 and spaced apart an amount sufficient to receive the rear end support means 13 of dumpster 10 therebetween, and plate 164B is provided with a pair of bars 166B extending transversely of track means 20 and spaced apart the same amount as bars 166A so as to receive the rear end support means 13 of dumpster 10 therebetween. Moreover, bars 166A and 166B are located on their carrier decks to insure that the rear end support means 13 of dumpster 10 are positioned between the pivot pins 90 for the wheel assemblies 60 and 62 (see FIG. 7) to be described hereafter to thereby keep the load between said pivot pins 90 to prevent tipping of carrier 24 during a load/unload operation. Bars 166A and 166B are secured on top of plates 164A and 164B, respectively, by means of welding. By this arrangement, the rear end support means 13 of dumpster 10 is locked or secured on the bed 164 of carrier 24 at a desired non-tipping position once such means has been positioned on the bed 164 between the bars 166A and 166B in a position as illustrated in FIGS. 1A, 1B, and 2 to 5, as discussed above during a description of the method of operating the dumpster handling means.

Figure 11:
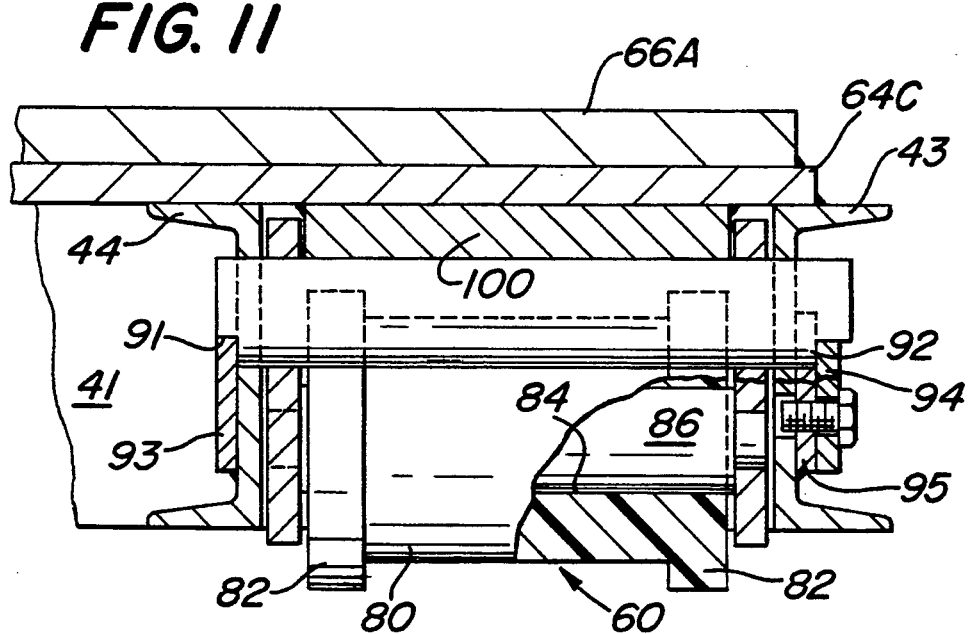
FIG. 11 is a detail view, partly in section, showing a wheel means for the dumpster supporting carriers.
Figure 12:
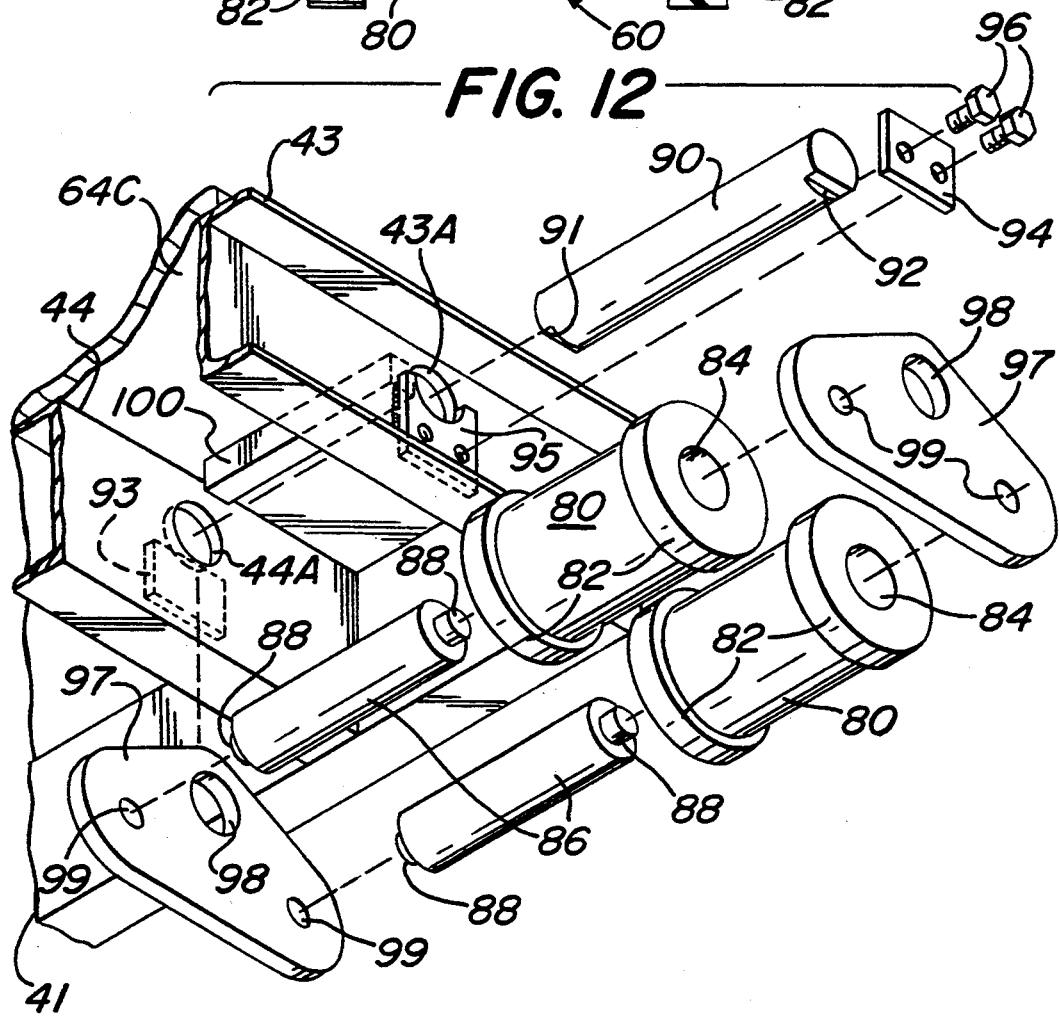
FIG. 12 is an exploded view of the wheel means shown in FIG. 11.

The wheel assemblies 60 and 62, which are best shown in FIGS. 8, 11, and 12, are identical in construction except that wheel assembly 60 uses flanged wheels and wheel assembly 62 uses flangeless wheels. Accordingly, only wheel assembly 60, which is shown in detail in FIGS. 11 and 12, will be described in detail.

Wheel assembly 60 comprises a pair of flanged wheels 80 and means for supporting wheels 80 for pivoting movement so as to accommodate any unlevel condition of the track means 20 on which the wheel assembly 60 rides and also to maintain an equal wheel loading on carriers 22 and 24. Each of the wheels 80 has a cylindrical track engaging central portion and a pair of flanges 82 at the ends thereof for limiting the lateral movement of the wheels 80 on the rails 37 of track means 20, as is apparent from the showing on the right side of FIG. 8. Each wheel 80 has an axial bore 84 for receiving the wheel axles 86 for rotating bearing contact as is conventional in the art. At each end thereof, axles 86 are provided with a reduced diameter cylindrical portion 88 which provides a shoulder at the end of axle 86 and a cylindrical extension for use in supporting the axle 86 as will be described hereafter.

The means for supporting wheels 80 for pivoting movement comprises a cylindrical pivot pin 90 mounted on the frame of carrier 22 to extend horizontally. Pivot pin 90 is constructed and arranged to be supported at its ends in circular holes 43A and 44A formed in the webs of channels 43 and 44, respectively, with the outer ends of pivot pin 90 projecting outwardly a short distance from said webs. The outer ends of pivot pin 90 are provided with right angle cutaway portions 91 and 92 having horizontal and radial shoulders as best shown in FIG. 12. A first retainer plate 93 is welded on the web of channel 44 to enclose the outer end of the lower portion of hole 44 and to engage the shoulders of cutaway portion 91 of pivot pin 90 so as to limit the movement of pivot pin 90 toward the left from its inserted position as shown in FIG. 11. A second retainer plate 94 is bolted (by means of a pair of bolts 96) onto a thread plate 95, which is welded onto the web of channel 43, the parts being constructed and arranged so that plate 94 engages the shoulders of the cutaway portion 92 of pivot pin 90 so as to limit the movement of pivot pin 90 toward the right as viewed in FIG. 11 and, in effect, hold pivot pin 90 in its operative wheel supporting position as shown in FIG. 11. By this arrangement, pivot pin 90 is mounted in a secure position and cannot move axially or rotate from the wheel supporting position as shown in FIG. 11. Each pivot pin 90 is further supported by a bar 100 welded to the underside of the plates forming the beds of carriers 22 and 24 as shown in the drawings.

Means are provided for supporting wheels 80 for pivoting movement on the fixedly mounted pivot pin 90. Such means comprises a pair of pivotally mounted plates 97 provided with a large upper hole 98 and a pair of small lower holes 99. The plates 97 are mounted on pivot pin 90 in a vertical condition with large holes 98 having the pivot pin 90 received therein and small holes 99 having the reduced diameter extensions 88 of the axles 86 of the wheels 80 received therein in an arrangement as shown in FIGS. 11 and 12. As will be apparent from a consideration of FIGS. 11 and 12, the wheels 80 are supported by the plates 97 in a manner such that any unevenness of the track on which the wheels 80 ride will be accommodated by an pivoting movement of the wheel assemblies 60, which movement is possible because the vertical plates 97 can pivot about the pivot pin 90 allowing the wheels 80 to move in a vertical direction.

As is apparent from FIGS. 11 and 12, the wheel assembly 60 can be removed from its operative position shown in FIG. 11 very easily to permit the replacement of any worn parts. Moreover, this removal can be achieved without any dismantling of any parts of the carriers 22 and 24. More specifically, the wheel assembly 60 can be removed by simply removing the bolts 96 from their engaged position to remove the second retainer plate 94. The pivot pin 90 can then be moved toward the right as viewed in FIG. 11 and withdrawn from its supporting position in the holes 43A and 44A of channels 43 and 44, whereupon the remaining parts of the wheel assembly 60 will simply drop downwardly out of their supported position and these parts can be easily separated from one another for the replacement of a worn part.

FIG. 8 illustrates the flangeless wheels 80' used in the wheel assembly 62. As shown in this figure, each wheel 80' has the configuration of a straight cylinder whereby as it rides on rail 37, it can move laterally thereof. Thus, the construction and arrangement of the wheel means eliminates the possibility of the carriers 22 and 24 binding as they move along tracks 31-34.

A feature of the wheel assemblies 60 and 62 of the invention is that the wheels 80 and 80' are made of a special material, namely, a self-lubricating cast polyamide. This material is capable of withstanding the harsh operating conditions under which a dumpster handling system in accordance with the invention must operate in some applications and can be used without the need of employing additional bearings, such as journal bearings or roller bearings, between the load bearing portion of a wheel and the axle support therefor. Moreover, this material provides good sliding and wear-resistant properties. A preferred material for the wheels 80 and 80' is that provided by TIMCO, INC. and designated as "PA 6 G+OIL". This material comprises cast polyamide with oil added before polymerization. By adding selected lubricating oils to the raw material, the oil becomes an integral part of the cast polyamide and is dispersible under sliding friction throughout the life span of the material. Furthermore, this material has a low coefficient of friction while running dry, has a low wear rate under most load conditions, and has a low moisture absorption and therefore good dimensional stability.

The dumpster handling system of the invention comprises power-operated means, in the form of winch means 26, engaged with the first carriage 22 for causing movement thereof back and forth along track means 20. Winch means 26 comprises a motor operated winch drum 25, a cable 27, and a sheave 28 arranged in the central area of the track means 20 between tracks 32 and 33 as shown in the drawings. Drum 25 is located at the back end of track means 20 and sheave 28 is located at the load/unload end of track means 20. Winch means 26 is a closed loop winch arrangement whereby cable 27 is wrapped around drum 25 for several loops sufficient to achieve the necessary driving friction between the drum 25 and the cable 27 and has a first unwrapped portion extending from drum 25 toward carriage 22 whereat one end of cable 27 is secured to rear channel 42 at midsection 40C of carriage 22. The other unwrapped portion of cable 27 extends from drum 25 toward the front of the track means 20 to pass around the grooved rim of sheave 28 and change direction to extend rearwardly toward the carriage 22 from the load/unload end of track means 20 so as to have its other end secured to the front channel 53 of midsection 40C of carriage 22. As best shown in FIG. 9, the axes of drum 25 and sheave 28 extend vertically so that the unwrapped portions of cable 27 are positioned in a generally horizontal arrangement relative to one another. Thus, the unwrapped portions of cable 27 can pass easily underneath the midsection 40C of carriage 22 without the contacting the same and interfering with the movement of the cable 27 as it wraps and unwraps around the drum 25. In FIG. 9, the winch means 26 and its associated parts are shown in solid lines.

In the operation of winch means 26, the motor operated drum 25 is caused to rotate in either direction depending on the desired movement of carriage 22. When drum 25 is caused to rotate in one direction, the unwrapped cable portion extending from the drum 25 to the rear channel 42 is caused to be pulled toward the rear of the track means 25 whereby the carriage 22 is moved rearwardly. When the drum 25 is caused to rotate in the opposite direction, the unwrapped portion of the cable that extends around the sheave 28 and back to the front channel 53 of carriage 22 is caused to be pulled toward the front (load/unload end) of the track means 20 whereby the carriage 22 is moved forwardly.

Figure 13:
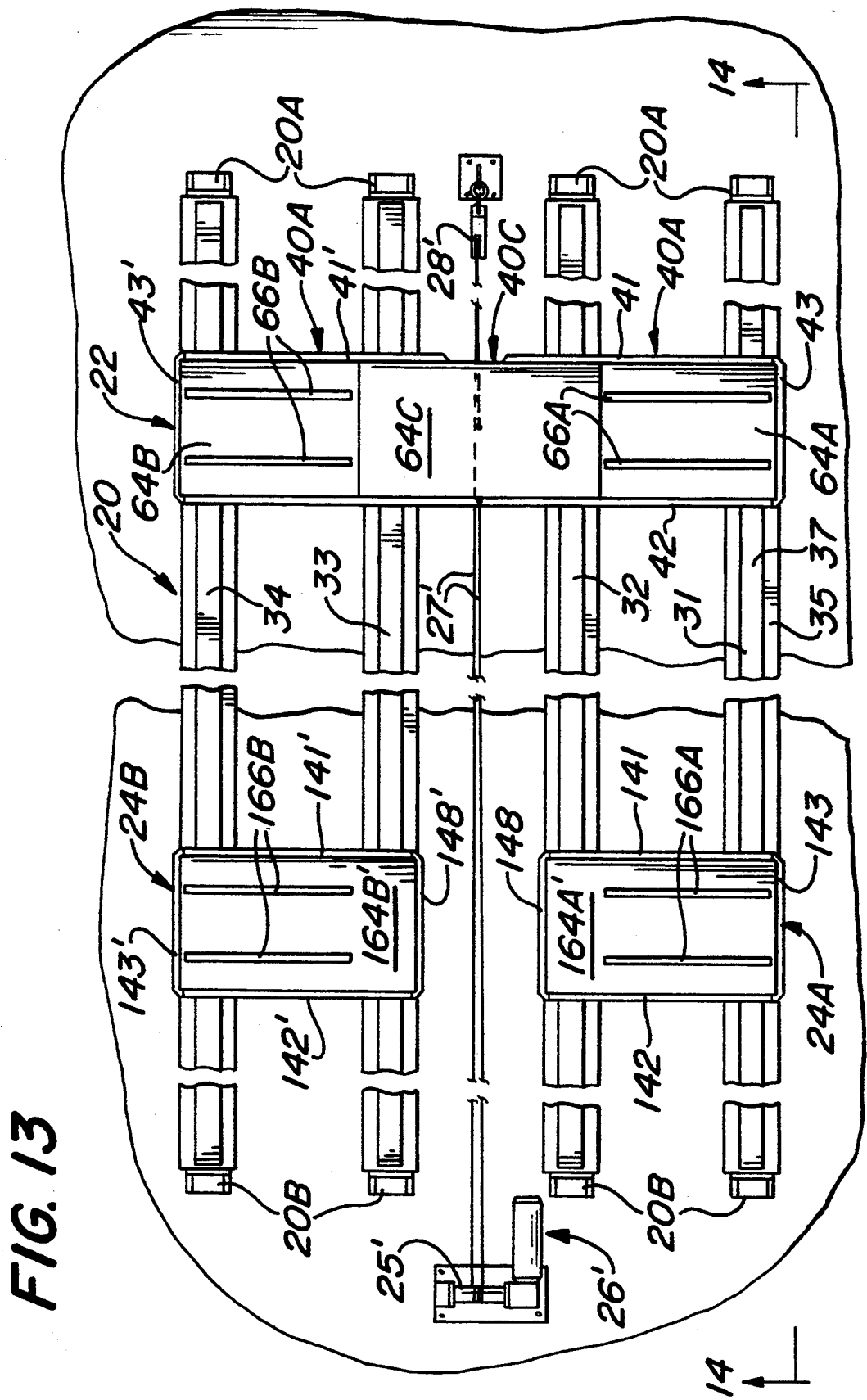
FIG. 13 is a plan view of another embodiment of the dumpster handling system in accordance with the invention.
Figure 14:
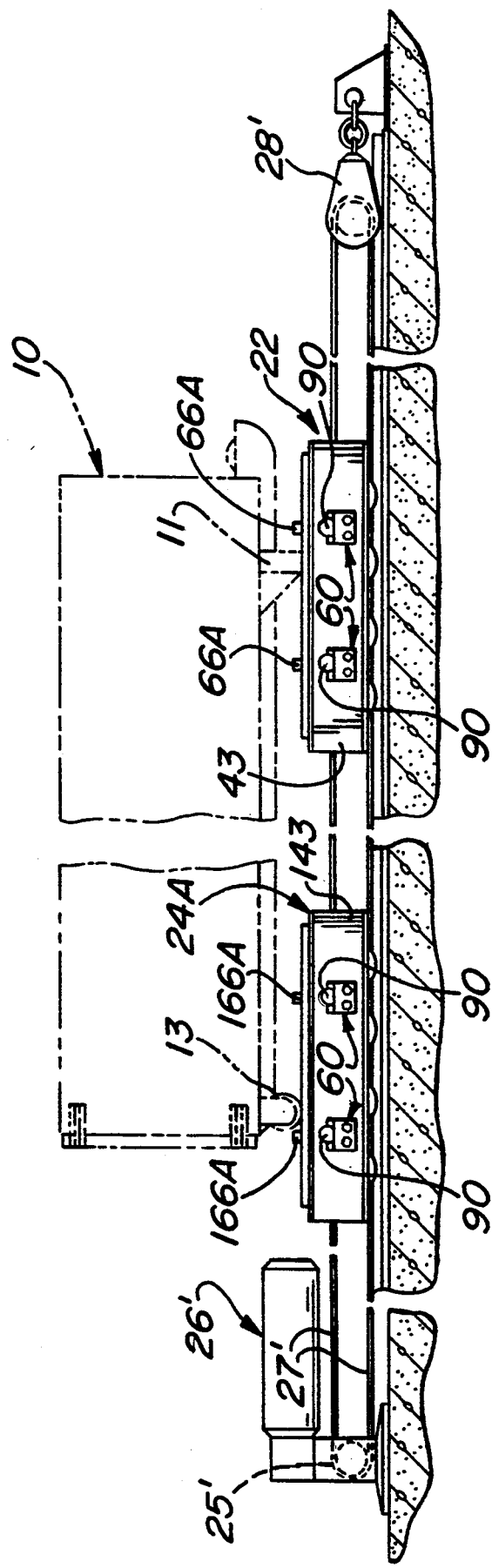
FIG. 14 is a sectional view taken on line 14—14 of FIG. 13.

In FIGS. 13 and 14, there is shown a second embodiment of the invention which is essentially the same as the embodiment of the invention shown in FIGS. 6 to 12, the only differences being (1) the use of a winch means 26' which has its drum 25' and sheave 28' mounted to rotate on horizontal axes (as shown in dashed lines in FIG. 9), and (2) the second carrier means is made of two separate carriers 24A and 24B as compared with a single carrier 24 as employed in the embodiment of FIGS. 6 to 12. Thus, the dumpster handling system shown in FIGS. 13 and 14 comprises four main components, namely track means 20, first dumpster supporting carrier 22, a second dumpster supporting carrier means including a pair of individual carriers 24A and 24B, and a power-operated means in the form of a motor driven winch means 26' and its associated drum 25', cable 27', and sheave 28'.

The winch means 26' is essentially the same as winch means 26 wherefore corresponding parts have been given the same reference numerals with primes added. The only difference between the winch means 26 and the winch means 26' is that the latter comprises a motor driven drum 25' and a sheave 28' constructed and arranged to rotate about a horizontal axis. FIG. 9 shows in dashed lines the manner in which the winch means 26' is connected to carrier 22 for causing the movement thereof back and forth along the track means 20. Thus, the portion of cable 27' extending between drum 25' and the rear channel 42 of carrier 22 is unwound from the upper end of the drum 25' and is connected to rear channel 42 at a location near the top thereof, i.e., higher than the connection for the corresponding cable 27 of winch means 26. Also, the portion of cable 27' extending between drum 25' to sheave 28' is unwound from the lower end of drum 25', said cable portion passing around a vertically arranged sheave 28' to extend from the top thereof toward carrier 22. The terminal end of the cable portion that extends between sheave 28' and the front channel 53 of carrier 22 is connected to front channel 53 near the top thereof, i.e., higher than the connection for the corresponding cable 27 of winch means 26. The construction and arrangement of winch means 26' is shown in dashed lines in FIG. 9 which shows that the lower cable portion extending between drum 25' and sheave 28' passes underneath the midsection 40C of carriage 22.

The second or rearward carrier means for the embodiment of FIGS. 13 and 14 is constructed and arranged to support the rear support means 13 of dumpster 10 and comprises a pair of individual carriers 24A and 24B. Carriers 24A and 24B have essentially the same construction as outer sections 70A and 70B, respectively, of carrier 24 wherefore corresponding parts have been given the same reference numerals. Thus, carrier 24A comprises a front channel 141, a rear channel 142, and six beam members corresponding to the beam members 143-148 of outer section 70A of carriage 24 extending between front channel 141 and rear channel 142, the outer beam members 143 and 148 being shown in FIG. 13. Carrier 24A also comprises three flat brace members corresponding to the brace members 149, 150, and 151 of outer section 70A of carrier 24, which brace members are arranged to extend across the span between the spaced apart beam members as discussed above with respect to carrier 24.

Carrier 24B comprises a front channel 141', a rear channel 142', and six beam members corresponding to the beam members 143'-148' of outer section 70B of carrier 24. There is also provided brace members similar to brace members 149'-151' for the outer section 70B.

As discussed above, there is no connection between the carriers 24A and 24B in the mid-area of the carrier means comprising the two individual carriers 24A and 24B.

Carriers 24A and 24B are each provided with wheel means for engaging the tracks 31-34 of track means 20 for supporting the carriers 24A and 24B for movement along the extent of the track means 20. Thus, each of the carriers 24A and 24B is provided with four pivoting wheel assemblies, including two wheel assemblies 60A located at the outer end thereof and having flanged wheels, and two wheel assemblies 62 located at the inner end thereof and having flangeless wheels. The arrangement of the wheel assemblies 60 and 62 is such that the flanged wheels of each wheel assembly 60 of carrier 24A ride on track 31, the flangeless wheels of each wheel assembly 62 of carrier 24A ride on track 32, the flanged wheels of each wheel assembly 60 of carrier 24B ride on track 34 and the flangeless wheels of each wheel assembly 62 of carrier 24B ride on track 33. By this arrangement of the wheel assemblies 60 and 62, the possibility of either of the carriers 24A or 24B binding on the tracks 31-34 is eliminated.

The bed of carrier 24A is provided by a steel plate 164A' and the bed of carrier 24B is provided by a steel plate 164B', which plates are secured in position on top of the top flanges of the channels forming the superstructure of carriers 24A and 24B as discussed above. Plate 164A' spans the area between channels 143 and 148 of carrier 24A. Plate 164B' spans the area between beam members 143' and 148' of carrier 24B.

The plate 164A' of carrier 24A is provided with means for securing and positioning the rear end support means 13 of dumpster 10 in position thereon. To this end, plate 164A' is provided with a pair of bars 166A extending transversely of the track means 20 and spaced apart an amount sufficient to receive the rear end support means 13 of dumpster 10 therebetween, and plate 164B' is provided with a pair of bars 166B extending transversely of track means 20 and spaced apart the same amount as bars 166A so as to receive the rear end support means 13 of dumpster 10 therebetween. Bars 166A and 166B are secured on top of plates 164A' and 164B', respectively, by means of welding. Moreover, bars 166A and 166B are located on their carrier decks to insure that the rear end support means 13 of dumpster 10 are positioned between the pivot pins 90 for the wheel assemblies 60 and 62 (see FIG. 14) to thereby keep the load between said pivot pins 90 to prevent tipping of carriers 24A and 24B during a load/unload operation. By this arrangement, the rear end support means 13 of dumpster 10 is locked or secured on the beds of carriers 24A and 24B in the desired non-tipping position once such means has been positioned on the plate 164A' and 164B' between the bars 166A and 166B in a position as discussed above during the description of the method of operating the dumpster handling means.

What is claimed is:

1. A dumpster handling system for collecting and transporting a loose solid material deposited from a fixed point of discharge into an interior of a roll-off dumpster having front end and rear end support means, comprising a track means extending laterally throughout a substantial distance underneath the point of discharge between a load/unload end and a back end of said track means, a first dumpster supporting carrier for supporting the front end support means of a dumpster, said first carrier including a bed for supporting the front end support means of the dumpster, means for securing the front end support means of the dumpster in position on said bed and means to engage said track means for supporting said first carrier for movement along the extent of said track means, a second dumpster supporting carrier for supporting the rear end support means of a dumpster, said second carrier including a bed for supporting the rear end support means of the dumpster, means for securing the rear end support means of the dumpster in position on said bed of said second carrier and means adapted to engage said track means for supporting said second carrier for movement along the extent of said track means, said second carrier being located on said track means between said first carrier and said back end of said track means and being manually movable along said track means, and power-operated winch means engaged with said first carrier for causing movement thereof back and forth along said track means.

2. A system according to claim 1 wherein said securing means of said first carrier comprises a pair of spaced apart bars constructed and arranged for restraining the movement of the front end support means of a dumpster supported thereon along said bed of said first carrier, and said securing means of said second dumpster carrier comprises a pair of spaced apart bars constructed and arranged for restraining movement of the rear end support means of a dumpster supported thereon along said bed of said second carrier.

3. A dumpster handling system according to claim 1 wherein said winch means comprises a motor operated cable drum located at one end of said track means, a sheave located at the other end of said track means, and a closed loop cable having a medial portion wound on said cable drum and a first unwrapped portion extending from said cable drum to said first carrier for connection thereto, and a second unwrapped cable portion extending from said drum to said sheave means whereat it changes direction and extends back to said first carrier for connection thereto.

4. A dumpster handling system according to claim 1 wherein each of said means for supporting said first and second carriers for movement along the extent of said track means comprises a plurality of wheel means, each of said wheel means comprising a pair of wheels and means for supporting said wheels on said associated carrier for pivoting movement about an axis extending transverse to said track means so as to accommodate any unlevel condition of said track means on which the wheel means rides and to equalize the wheel loading.

5. A dumpster handling system according to claim 4 wherein each of said wheel means comprises a wheel and an axle on which said wheel rotates, said wheel being made of a self-lubricating cast polyamide material having good sliding and wear resistant properties.

6. A dumpster handling system according to claim 2 wherein each of said means for supporting said first and second carriers for movement along the extent of said track means comprises a plurality of wheel means, each of said wheel means comprising a pair of wheels and means for supporting said wheels on an associated carrier for pivoting movement about an axis extending transverse to said track means so as to accommodate any unlevel condition of said track means on which the wheel means rides and to equalize the wheel loading.

7. A dumpster handling system according to claim 6 wherein each of said pair of spaced apart bars of said first and second carriers is located to extend transversely of said track means at locations inwardly of a transverse axis of a wheel supporting means of an associated carrier.

8. A dumpster handling system for collecting and transporting a loose solid material deposited from a fixed point of discharge into an interior of a roll-off dumpster having front end and rear end support means, comprising a track means extending laterally throughout a substantial distance underneath the point of discharge between a load/unload end and a back end of said track means, a first dumpster supporting carrier for supporting the front end support means of a dumpster, said first carrier including a bed for supporting the front end support means of the dumpster, means for securing the front end support means of the dumpster within a support area on said bed and means to engage said track means for supporting said first carrier for movement along the extent of said track means, said first carrier supporting means extending downwardly from said first carrier to engage said track means and including bearing means in load bearing engagement with said first carrier at locations on an axis extending transverse to said track means and outwardly of said support area of the front end support means of the dumpster, a second dumpster supporting carrier for supporting the rear end support means of a dumpster, said second carrier including a bed for supporting the rear end support means of the dumpster, means for securing the rear end support means of the dumpster within a support area on said bed of said second carrier and means adapted to engage said track means for supporting said second carrier for movement along the extent of said track means, said second carrier supporting means extending downwardly from said second carrier to engage said track means and including bearing means in load bearing engagement with said second carrier at locations on an axis extending transverse to said track means and outwardly of said support area of the rear end support means of the dumpster, said second carrier being located on said track means between said first carrier and said back end of said track means and being manually movable along said track means, and power-operated winch means engaged with said first carrier for causing movement thereof back and forth along said track means.

* * * * *